United States Patent [19]
Roselle

[11] 3,792,336
[45] Feb. 12, 1974

[54] LINEAR TO STEP MOTION CONVERTER

[75] Inventor: Pierce C. Roselle, Phoenix, Ariz.

[73] Assignee: Sperry Rand Corporation, New York, N.Y.

[22] Filed: June 4, 1971

[21] Appl. No.: 150,070

[52] U.S. Cl. .................. 318/696, 318/691, 340/347
[51] Int. Cl. .............................................. G05b 11/12
[58] Field of Search ... 318/691, 695, 138, 254, 696, 318/685, 672, 674; 340/347 SY, 347 AD

[56] References Cited

UNITED STATES PATENTS

| | | | |
|---|---|---|---|
| 3,418,547 | 12/1968 | Dudler | 318/685 X |
| 3,140,433 | 7/1964 | Stottels | 318/685 |
| 2,418,193 | 4/1947 | Peterson | 318/690 |
| 3,577,058 | 5/1971 | Cohen | 318/691 |
| 3,359,474 | 12/1967 | Welch et al | 318/696 |
| 3,239,734 | 3/1966 | Levy | 318/695 X |
| 2,461,511 | 2/1949 | Baecher | 318/695 |
| 3,419,800 | 12/1968 | Levi et al. | 340/347 AD X |
| 2,424,843 | 7/1947 | Owsley | 318/691 |
| 3,564,381 | 2/1971 | Parfomak et al. | 318/691 |
| 3,548,284 | 7/1968 | Espen | 318/691 |

*Primary Examiner*—G. R. Simmons
*Attorney, Agent, or Firm*—S. C. Yeaton; Howard P. Terry

[57] ABSTRACT

The invention comprises a conversion system for transforming an analog input signal into an incremental digital output signal. A synchro, responsive to the input analog signal provides signal nulls at specific input signal values. The signals obtained thereby are used as control signals to energize individual coils of a stepper motor. A display attached to the rotor of the stepper motor will rotate in step fashion and provide an indication of the input signal.

7 Claims, 5 Drawing Figures

INVENTOR
PIERCE C. ROSELLE
BY
HP Terry
ATTORNEY

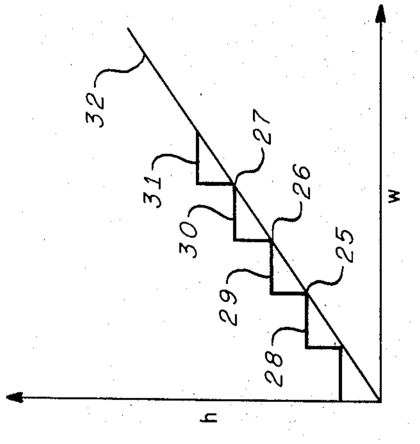
FIG. 2b.
TRUTH TABLE
| D | C' | B' | A' | $T_1$ | $T_2$ | $T_3$ |
|---|---|---|---|---|---|---|
| 0 | 0 | 0 | 1 | 0 | 0 | 1 |
| 0 | 0 | 1 | 0 | 0 | 1 | 0 |
| 0 | 1 | 0 | 0 | 1 | 0 | 0 |
| 1 | 1 | 0 | 0 | 0 | 1 | 0 |
| 1 | 0 | 1 | 0 | 0 | 0 | 1 |
| 1 | 0 | 0 | 1 | 1 | 0 | 0 |
| 1 | 0 | 0 | 0 | 0 | 0 | 0 |
| 0 | 0 | 0 | 0 | 0 | 0 | 0 |
FIG. 2a.
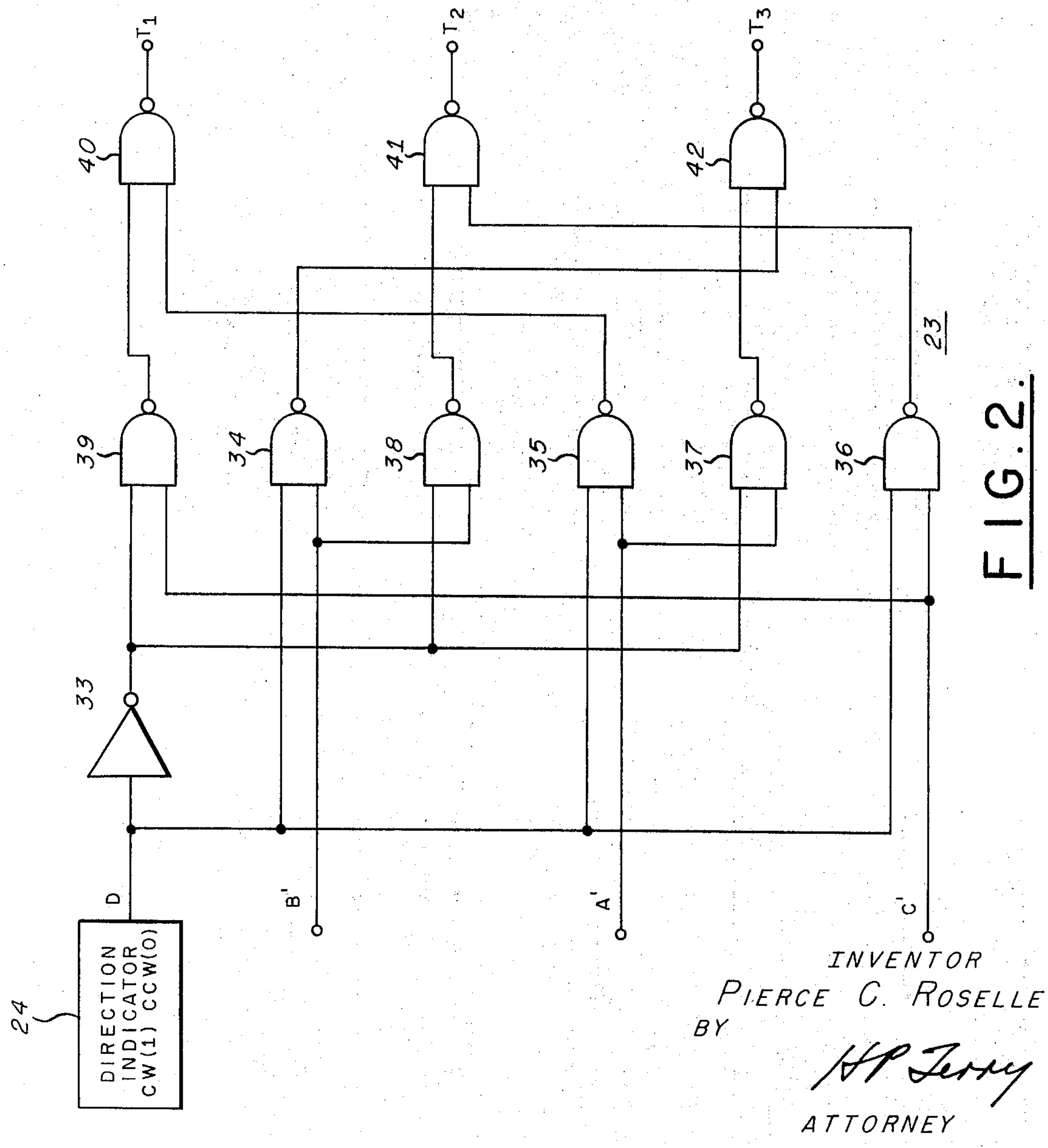
FIG. 2.
INVENTOR
PIERCE C. ROSELLE
BY
HP Terry
ATTORNEY

LINEAR TO STEP MOTION CONVERTER

BACKGROUND OF THE INVENTION

1. Field of the Invention

The invention relates to devices useful in converting linear rotary motion to discrete step functions.

2. Description of the Prior Art

Previously known devices for converting linear rotary motion to discrete step motion involved the use of mechanical devices such as springs and detents, clutches, and geneva mechanisms. These devices, though producing the desired output function were large, clumsy, and suffered the wear characteristics of all mechanical devices, hence reducing reliability. If for any reason the degree of stepping in respect to the inputted rotary motion was to be altered, there usually had to be a gear change and the attendance disassembly and assembly of the device. Where gear change was provided for, the devices were larger than otherwise required and the type of gear changes to be made had to be preselected. Similarly, if the dead zone were to be modified, mechanical alterations were necessary.

SUMMARY OF THE INVENTION

Devices having linear rotary shaft motions may be modified in accordance with the invention by attaching an electrical synchro thereto responsive to the shaft motion. At specific but different shaft positions each of the three output leads of the synchro will have a null output. These nulls may be detected through a null detector and the output thereof may be used to drive logic circuitry. The output of the logic circuitry may be so configured as to determine the direction of rotation, amount of dead zone or hysteresis, and the lead or lag of the output shaft with respect to the rotary shaft. The logic outputs may then be used to drive a stepper motor in proportionate speed and equivalent direction of the rotary shaft. The output of the stepper motor will then track, but in discrete stepping motions, the rate and direction of rotation of the input rotary shaft.

A primary object of the invention is to provide electronic means for converting rotary motion to a stepping motion.

Another object of the invention is to provide a means whereby the dead zone may be varied through a simple adjustment of the null detectors.

Another object of the invention is to provide a simple effective means for varying the size of the steps of the output signal.

Another object of the invention is to provide a means whereby the stepping motion may be converted to linear motion by a simple adjustment.

Another object of the invention is to provide a means for altering the lead or lag of the stepping output by simple circuit adjustments.

BRIEF DESCRIPTION OF THE DRAWINGS

FIG. 2 illustrates logic circuitry useful in the invention.

FIG. 2A illustrates a truth table for the logic circuitry shown in FIG. 2.

FIG. 2B illustrates the plot of a typical output signal produced by the circuit shown in FIG. 2.

DESCRIPTION OF THE PREFERRED EMBODIMENT

Figures 1, 1A:
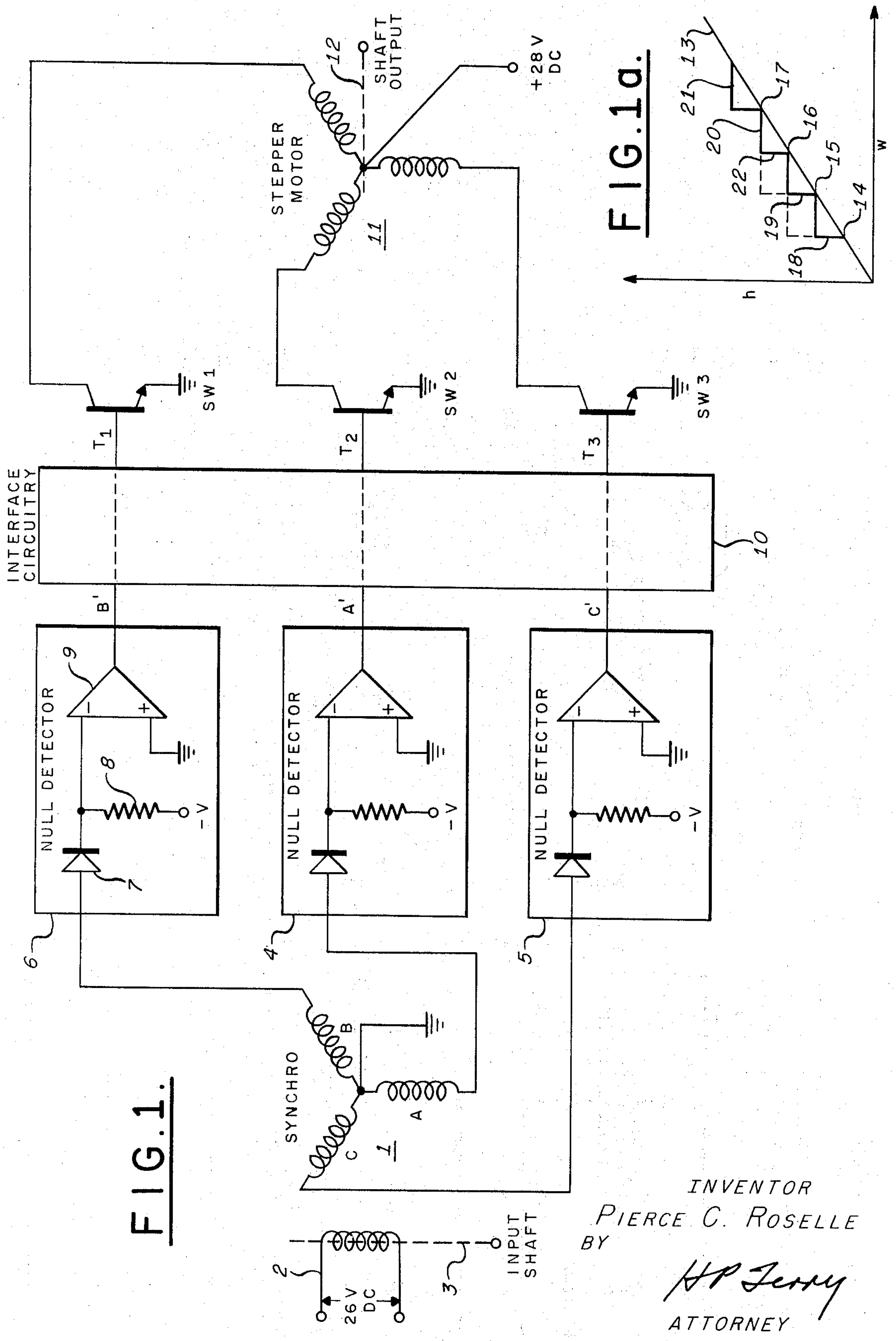
FIG. 1 illustrates the basic components comprising the invention.
FIG. 1A illustrates the plot of a typical output signal provided by the circuit of FIG. 1.

Aircraft instruments present to the pilot a variety of vital indications representative of the spatial relationship between a fixed reference point and the aircraft itself. The nature of the indicia presented by the instruments may be of any of a variety of formats depending on the type of information to be presented. One of the most commonly used and readily accepted formats is that of a pointer rotating about the center of a card, where the card usually has a plurality of printed indicia. The extremity of the pointer pointing to an indicium provides the pilot with the information available from the instrument. Of necessity, such instruments can only produce an analog type signal as the pilot must extrapolate the information desired whenever the pointer is not exactly aligned with an indicium. In many applications, both an analog signal and a digital signal are desired in that many pilots prefer to use the analog indicia to determine the rate of increase or decrease of the parameter indicated on the instrument, while the digital indicator is used to provide the exact value of the parameter indicated. During any rapid parameter change, the digital indicator must necessarily present a rapid change. Such a rapid change may create too rapid a digital movement for a visually useful output. The teaching of the invention provides a means for maintaining the utilitarian aspect of digital indicators in such situations.

In the system to be described, the input signal is representative of the altitude of an aircraft. During normal operation the altitude of the aircraft is indicated by both a rotating pointer and by means of a plurality of wheels, collectively representing the units, tens, hundreds, etc of the altitude (in feet) to be displayed. During a rapid ascent or descent, the pointer instrument rotates rapidly but the pilot is usually able to continue to estimate his altitude. In the digital indicator, one or more of the wheels begins to rotate too fast to provide a useful visual indication. In order to provide a useful digital indicator under these circumstances, the instant invention was developed.

Referring to FIG. 1, there is shown a synchro 1 with its associated excitation coil 2 and input shaft 3. In the preferred embodiment, shaft 3 rotates in response to a signal from an altitude sensor (not shown) and thereby provides the requisite intelligence. The coils A, B, and C of synchro 1 are connected so as to sequentially produce a zero signal or null condition for every sixty degrees of rotation of the input shaft. The rate of occurrence of the sequential nulls and their direction of rotation are indicative of the rate of altitude change and the direction of change.

Each of the null detectors 4, 5 and 6 detects the nulls occurring on its particular leg of synchro 1. Each of the null detectors shown operates in the same manner and for the sake of brevity only the operation of null detector 6 will be described. In other than a null condition there will be an A.C. voltage across coil B. The detector 6 comprises a rectifying diode 7 biased by a negative voltage source (—v) through resistor 8 and connected to the inverting input of an operational amplifier 9. In operation, the output B′ of the operational amplifier 9 will be negative as long as the rectified a.c. voltage is greater than the diode bias voltage and presents a positive voltage input signal to the operational amplifier 9. As the voltage at coil B decreases, diode 7 will stop conducting when the negative bias voltage approximates the decreasing a.c. voltage of coil B. At this point, the input to the operational amplifier will be negative and the output of the operational amplifier becomes positive. The point of switchover is termed the null position. The threshold may of course be modified by varying the resistor 8 or the value of the negative voltage (−v). Additional refinements of the null detector 6 will be obvious to those skilled in the art.

The null detector outputs, B', A', and C' are inputted to interface circuitry 10 to leads $T_1$, $T_2$ and $T_3$ and ultimately control switches $SW_1$, $SW_2$ and $SW_3$, respectively. These switches are shown as NPN transistors with their bases connected to leads $T_1$, $T_2$ and $T_3$ respectively. A positive signal on any of the leads $T_1$, $T_2$ or $T_3$ will cause its respective transistor to conduct.

The collector of each transistor is connected to one of the three coils of a stepper motor 11. Thus, if any transistor conducts, its associated coil of the stepper motor will be energized. An energized coil of the stepper motor 11 will cause its rotor, represented as output shaft 12 to align itself therewith. Indicia representative of units of altitude such as 20, 40, or 100 feet is operably associated with the output shaft 12. Thus, as the stepper motor is energized it will present the altitude in increments of the lowest value digital wheel and the rate of visual presentation of the respective wheel is reduced by a factor equivalent to the increment.

In summary, continuous rotation of the input shaft will periodically cause switches $SW_1$, $SW_2$ or $SW_3$ to energize the respective coil of the stepper motor 11, whereby the analog input is converted to a digital output.

The interface circuitry as shown in FIG. 1 comprises simply a straight through connection without any alteration. FIG. 1*a* depicts a graph representing a typical stepper motor output signal in response to a change in altitude of an aircraft. The ordinate depicts altitude and the abscissa depicts rotation of the input shaft with the line 13 representative of a constant aircraft altitude change. Points 14, 15, 16 and 17 represent synchro 1 nulls detected by the respective null detector. The steps indicated as 18, 19, 20 and 21 represent the displayed output of the stepper motor 11. Thus, as the aircraft passes through the altitude represented by point 14, a null will occur and the stepper motor 11 will rotate one step. The indicated altitude will be that equivalent to point 15 and equal to the actual altitude plus the incremental altitude variation of the display.

At point 15, the process will repeat itself and the altitude at point 16 will be indicated, and so on. If the aircraft exceeds the altitude represented by point 16 (the digitally indicated altitude will be that of point 17) and then levels off and begins to descend before reaching the altitude represented by point 17, the digital indication will not immediately be affected. When the aircraft descends below point 16, the stepper motor coil corresponding thereto will be activated. However, as the same coil was energized while the aircraft was ascending, the stepper motor 11 will not rotate to reflect any change in position. Thus, the indicated output equivalent to point 17 will continue to be displayed. As the aircraft continues to descend, it will drop below the altitude represented by point 15. At that time another coil of the stepper motor 11 will be energized. During the descent, the input shaft 3 rotation has reversed and, a fortiori, has reversed the direction of rotation. Thus, the stepper motor coil energized prior to that of step 16 will again be energized. This represents one incremental change and produces a digital output equivalent to point 16 even though the aircraft is at or below the altitude of point 15. Should the aircraft once again begin to ascend, the visual digital output will remain the same until the second succeeding altitude point is reached. At that instant the actual and displayed altitudes will be the same.

As can be determined from the above discussion, during ascent the indicated altitude will lead the aircraft altitude up to one increment while during descent, the indicated altitude may lag the aircraft up to two altitude increments. Such variations and inaccuracies may not be acceptable in certain aircraft applications.

FIG. 2 illustrates logic circuitry 23 designed to overcome the built-in tolerance level existing due to the properties of interfacing the input and output portions of the circuit as shown in FIG. 1. FIG. 2*a* is the truth table for the logic circuit 23 and FIG. 2*b* is a graph depicting the response of the digital indicator to altitude changes. In this modification, it is intended that the logic circuit 23 be inserted in place of the interface circuitry 10 shown in FIG. 1 with input leads A', B', and C' connected to the appropriate null detectors and output leads $T_1$, $T_2$ and $T_3$ connected to the appropriate switches. A fourth input, D, to the logic circuit 23 provides an indication of the rotation of the input shaft 3. Although a plurality of NAND gates and one inverter are shown, variations may be made in the circuit provided that the truth table of FIG. 2*a* is controlling.

The operation of the logic circuit may be representatively explained as follows. The direction indicator 24 is operably associated with the input shaft 3 direction of rotation and provides one output (high) for clockwise rotation and a second output (low) for counterclockwise rotation. If it is assumed that the aircraft is ascending in accordance with line 32 in FIG. 2*b;* that ascent is equivalent to counterclockwise movement of input shaft 3; and that point 35 corresponds to a null (high input) on lead A', the operation is as follows. Indicator 24 will provide a low output to inverter 33, and NAND gates 34, 35 and 36. Lead A' will provide a high input to NAND gates 35 and 37. Lead B' will provide a low input to NAND gates 34 and 38. Lead C' will provide a low input to NAND gates 36 and 39. Inverter 33 will provide a high input to NAND gates 37, 38 and 39. NAND gates 35 and 39 will provide high inputs to NAND gate 40 resulting in a low output therefrom. NAND gates 36 and 38 will provide high inputs to NAND gate 41 resulting in a low output therefrom. NAND gate 34 will provide a high input to NAND gate 42, while NAND gate 37 provides a low input thereto, resulting in a high output from NAND gate 42. The positive signal on lead $T_3$ will cause switch $SW_3$ to close and the stepper motor coil associated therewith will be energized. The output shaft 12 will rotate in response to the energized coil and the indicia displayed will change from that represented as step 28 to that of step 29.

From the truth table it can be seen that a null of lead B', corresponding to point 26, will produce an output on lead $T_2$, energize another coil of the stepper motor, and cause the indicator to display an altitude represented by step 30. Similarly, a null on lead C' corresponds to point 27 and will cause an altitude equivalent to step 31 to be displayed.

If instead of continuing to ascend, the aircraft levels off and begins to descend while at an altitude between points 26 and 27, the altitude displayed will be that of step 30 until the altitude is less than that represented by point 26. As the aircraft alters from ascent to descent, the rotation of input shaft 3 will reverse. The output of direction indicator 24 is then changed from a low to a high. On reaching the altitude represented by point 26 there will again be a null on lead B'. However, this time a signal on lead B' will result in an output on lead $T_3$, rather than lead $T_2$ as during the ascent. As the coil energized for level 30 corresponded to lead $T_2$, a different coil of the stepper motor 11 is now energized resulting in rotation of output shaft 12 and a visual display representing step 29.

From the above description, it can be seen that during ascent the displayed altitude will lead the aircraft by an amount equivalent to the altitude indicator increment. During descent the indicator will log the actual aircraft altitude by a maximum amount equivalent to the altitude increment. Thus, the maximum possible deviation displayed is that of twice the value of the increment.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A conversion system for converting an analog input signal into a digital output signal comprising a synchro for generating a plurality of phase displaced alternating voltages in response to a rotating excitation coil, a plurality of null detectors including diode means for rectifying said alternating voltage, means coupled to said diode means for biasing said rectifying means, differential amplifier means coupled to said diode means for providing an output of one sense when the amplitude of said alternating voltage is greater than the bias, and an output of a second sense when the amplitude of said alternating voltage is less than the bias, each of said detectors being responsive to a corresponding one of said alternating voltages, for detecting pre-determined null conditions of said alternating voltages, a plurality of switches, each of said switches being responsive to output signals produced by a corresponding one of said detectors, a plurality of coils, forming the stator of a stator motor, each of said coils responsive to energization of a corresponding one of said switches, and a rotor of said stepper motor rotatably responsive to energization of said coils, whereby said rotor will rotate incrementally in response to said null conditions of said alternating voltages to provide a step function output.

2. The conversion system as claimed in claim 1 wherein each of said switches comprises a transistor having its collector connected to one of said coils of said stepper motor, its emitter connected to ground and its base connected to a corresponding one of said differential amplifier detectors whereby an output from said detector of one sense renders said transistor non-conducting and an output of another sense renders said transistor conducting.

3. The conversion system as claimed in claim 2 including interface circuitry disposed between said detectors and said switches comprising a direction indicator having an output in one sense for clockwise rotation of said excitation coil and an output of another sense for counterclockwise rotation of said excitation coil, a first plurality of NAND gates responsive to said indicator output and said detector outputs, and a second plurality of NAND gates responsive to the output of said first plurality of NAND gates for providing a signal to each of said switches.

4. The conversion system as claimed in claim 3 including an inverter for inverting the output of said indicator.

5. The conversion system as claimed in claim 4 wherein a first half of said first plurality of NAND gates have a first input from said indicator and a second input from one of said detectors and a second half of said first plurality of NAND gates have a first input from said inverter and a second input from one of said detectors.

6. The conversion system as claimed in claim 1 in which said plurality of detectors include three detectors, each responsive to the alternating voltage on one of the output leads of said synchro, said plurality of switches include three switches, each associated with one of three coils of said stepper motor, and said conversion system further includes interface circuitry disposed between said detectors and said switches comprising, a direction indicator having an output in one sense for clockwise rotation of said excitation coil and an output of another sense for counterclockwise rotation of said excitation coil, and logic circuitry arranged in accordance with the control law in the form of

| D | C | B | A | $T_1$ | $T_2$ | $T_3$ |
|---|---|---|---|---|---|---|
| 0 | 0 | 0 | 1 | 0 | 0 | 1 |
| 0 | 0 | 1 | 0 | 0 | 1 | 0 |
| 0 | 1 | 0 | 0 | 1 | 0 | 0 |
| 1 | 1 | 0 | 0 | 0 | 1 | 0 |
| 1 | 0 | 1 | 0 | 0 | 0 | 1 |
| 1 | 0 | 0 | 1 | 1 | 0 | 0 |
| 1 | 0 | 0 | 0 | 0 | 0 | 0 |
| 0 | 0 | 0 | 0 | 0 | 0 | 0 |

where D represents the input from said direction indicator; A, B, and C represent the output of said detectors respectively; and $T_1$, $T_2$, and $T_3$ represent the inputs to said switches, respectively.

7. A conversion system for converting an analog input signal into a digital output signal comprising wye-connected coil means for deriving a three phase alternating voltage in response to a rotatable coil, detector means including diode rectifying means coupled to each wye-connected coil means for detecting a null condition in each half-cycle of each of said three phase alternating voltages, a plurality of switches, each responsive to output signals produced by one of said detectors, and a stepper motor including a plurality of coils each energized in response to one of said switches, whereby the rotor of said stepper motor will rotate in step fashion in response to said energized coils and thereby simulate the rotation of said rotatable coil.

* * * * *